US011130878B2

(12) United States Patent
Xu et al.

(10) Patent No.: US 11,130,878 B2
(45) Date of Patent: Sep. 28, 2021

(54) COATING COMPOSITION WITH HIGH HYDROPHOBIC RESISTANCE AND HIGH HYDROPHILIC RESISTANCE

(71) Applicants: Dow Global Technologies LLC, Midland, MI (US); Rohm and Haas Company, Collegeville, PA (US)

(72) Inventors: Jianming Xu, Shanghai (CN); Wei Cui, Shanghai (CN); Tao Wang, Highton (AU); Siyuan Jiang, Shanghai (CN); Qingwei Zhang, Shanghai (CN); Daoshu Lin, Shanghai (CN)

(73) Assignees: Dow Global Technologies LLC, Midland, MI (US); Rohm and Has Company, Collegeville, PA (US)

( * ) Notice: Subject to any disclaimer, the term of this patent is extended or adjusted under 35 U.S.C. 154(b) by 108 days.

(21) Appl. No.: 16/330,323

(22) PCT Filed: Sep. 2, 2016

(86) PCT No.: PCT/CN2016/097863
§ 371 (c)(1),
(2) Date: Mar. 4, 2019

(87) PCT Pub. No.: WO2018/040060
PCT Pub. Date: Mar. 8, 2018

(65) Prior Publication Data
US 2019/0225830 A1    Jul. 25, 2019

(51) Int. Cl.
| | | |
|---|---|---|
| *C09D 133/14* | (2006.01) | |
| *C08F 220/18* | (2006.01) | |
| *C09D 133/08* | (2006.01) | |
| *C09D 133/10* | (2006.01) | |
| *C09D 5/00* | (2006.01) | |

(52) U.S. Cl.
CPC .......... *C09D 133/14* (2013.01); *C08F 220/18* (2013.01); *C09D 5/00* (2013.01); *C09D 133/08* (2013.01); *C09D 133/10* (2013.01)

(58) Field of Classification Search
CPC .. C09D 133/14; C09D 133/08; C09D 133/10; C09D 5/00; C08F 220/18
USPC ........................................................ 524/558
See application file for complete search history.

(56) References Cited

U.S. PATENT DOCUMENTS

| | | | |
|---|---|---|---|
| 2,298,039 | A * | 10/1942 | D Alelio ............... C08F 220/18 526/325 |
| 5,149,754 | A | 9/1992 | Green et al. |
| 5,360,827 | A | 11/1994 | Toda et al. |
| 6,794,436 | B2 | 9/2004 | Schlarb et al. |
| 8,728,712 | B2 | 5/2014 | Yabuki et al. |
| 9,012,027 | B2 * | 4/2015 | Nabuurs ............... C09D 135/02 428/522 |
| 2010/0063171 | A1 | 3/2010 | Roschmann et al. |
| 2010/0298483 | A1 | 11/2010 | Allen et al. |
| 2011/0282000 | A1 | 11/2011 | Hayes |
| 2013/0065070 | A1 | 3/2013 | Nabuurs et al. |
| 2014/0377454 | A1 | 12/2014 | Iftime et al. |
| 2014/0377464 | A1 | 12/2014 | Nabuurs et al. |

FOREIGN PATENT DOCUMENTS

| | | |
|---|---|---|
| CN | 104204008 A | 12/2014 |
| EP | 22633 A2 | 1/1981 |
| EP | 265508 A4 | 6/1989 |
| EP | 404184 A2 | 12/1990 |
| EP | 915108 A1 | 5/1999 |
| EP | 959176 A1 | 11/1999 |
| JP | S5880356 A | 5/1983 |
| JP | 6092367 B2 | 3/2017 |
| WO | 0068304 A1 | 11/2000 |
| WO | 2007112503 A1 | 10/2007 |
| WO | 2011073417 A1 | 6/2011 |
| WO | 2012084973 A1 | 6/2012 |
| WO | 2012084974 A1 | 6/2012 |
| WO | 2012084977 A1 | 6/2012 |
| WO | 2016128574 A1 | 8/2016 |

OTHER PUBLICATIONS

Chinese First Search Report for the corresponding Chinese Application No. 2016800884809; International Date of Filing: Feb. 14, 2019; dated Jul. 2, 2020; 2 pages.
Supplementary European Search Report for the corresponding European Application No. 16914626; Date of Completion: Mar. 6, 2020; 2 pages.

* cited by examiner

*Primary Examiner* — Michael Bernshteyn
(74) *Attorney, Agent, or Firm* — Karl E. Stauss; Cantor Colburn LLP

(57) ABSTRACT

This invention generally relates to a coating composition which provides a coating film with high hydrophilic resistance and high hydrophobic resistance. The coating composition contains a polymer formed from a monomer composition comprising (a) 45-85 wt % of ethyl ester of acrylic acid or methacrylic acid and (b) 15-54 wt % of itaconic ester with 1 or 2 carbon atoms as a binder of the coating composition, and the weight of sum of (a) and (b) is 65% or more based on the total weight of the polymer.

7 Claims, No Drawings

COATING COMPOSITION WITH HIGH HYDROPHOBIC RESISTANCE AND HIGH HYDROPHILIC RESISTANCE

FIELD

The present invention generally relates to a coating composition which provides coating films (coatings) with high hydrophilic resistance and high hydrophobic resistance.

BACKGROUND

Recently, acrylic emulsion compositions are used for coatings for constructions or buildings because of their good performance characters. Stain resistance is one of the important characters for coatings used for such purposes, especially for interior coatings. Normally, acrylic emulsion compositions provide coatings with good stain resistance to hydrophilic stain. However, those coatings tend to have a poor performance to prevent hydrophobic stain. The reason is that typical acrylic emulsion coating compositions comprise an acrylic polymer which has relative hydrophobic backbone, so the coatings formed from such coating compositions have strong affinity with the hydrophobic stains, which cause poor hydrophobic stain resistance.

Coating compositions comprising a polymer formed from a monomer composition comprising itaconic esters are disclosed in some references, for example, US2014/0377464A, US2013/0065070A, WO2012/084973, WO2012/084977A, WO2012/084974A, U.S. Pat. Nos. 5,149,754A and 6,794,436B. But it is still desirable to develop a coating composition which provide a coating film having high hydrophobic stain resistance without decreasing high hydrophilic stain resistance.

SUMMARY

One aspect of the present invention provides a coating composition comprising a polymer, wherein the polymer comprises, as polymerization units, based on the total weight of the polymer: (a) from 45 weight % (wt %) to 85 wt % ethyl ester of acrylic acid or methacrylic acid, (b) from 15 wt % to 54 wt % of at least one itaconic acid ester characterized by the following formula:

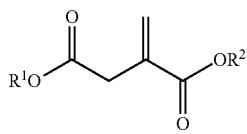

wherein $R^1$ and $R^2$ are separately hydrogen atom or alkyl group having 1 or 2 carbon atoms and when either $R^1$ or $R^2$ is hydrogen atom the other is not hydrogen atom; and (c) optionally an ethylenically unsaturated monomer having at least one functional group selected from carboxyl group, carboxylic anhydride group, hydroxyl group, amide group, sulfonic acid group or phosphate group; and the weight of sum of (a) and (b) is 65 wt % or more based on the total weight of the polymer.

Another aspect of the invention relates to a method for preparing a coating composition comprising the step of polymerizing a monomer composition comprising (a) from 45 wt % to 85 wt % of ethyl ester of acrylic acid or methacrylic acid; (b) from 15 wt % to 54 wt % of at least one itaconic acid ester characterized by the following formula:

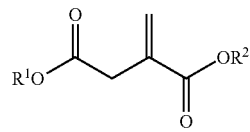

wherein $R^1$ and $R^2$ are separately hydrogen atom or alkyl group having 1 or 2 carbon atoms and when either $R^1$ or $R^2$ is hydrogen atom the other is not hydrogen atom; and (c) optionally an ethylenically unsaturated monomer having at least one functional group selected from carboxyl group, carboxylic anhydride group, hydroxyl group, amide group, sulfonic acid group or phosphate group, and the weight of sum of (a) and (b) is 65% or more based on the total weight of monomers in the monomer composition.

DETAILED DESCRIPTION

Exemplary embodiments in accordance with the present invention will be described. Various modifications, adaptations or variations of the exemplary embodiments described herein may become apparent to those skilled in the art as such are disclosed. It will be understood that all such modifications, adaptations or variations that rely upon the teachings of the present invention, and through which these teachings have advanced the art, are considered to be within the scope and spirit of the present invention. As used herein and throughout the specification, the term "(meth)acrylate" is meant to include both acrylate and methacrylate. The term "ethyl (meth)acrylate" is meant to include both ethyl ester of acrylic acid and ethyl ester of methacrylic acid.

The coating composition comprises a specific polymer. The polymer comprises, as polymerization units, (a) ethyl ester of acrylic acid or methacrylic acid, (b) at least one specific itaconic ester and (c) optionally an ethylenically unsaturated monomer having at least one functional group selected from carboxyl group, carboxylic anhydride group, hydroxyl group, amide group, sulfonic acid group or phosphate group. It means, the specific polymer is made from a monomer composition comprising monomers (a) and (b) described above, or a monomer composition comprising monomers (a), (b) and (c) described above.

The amount of the ethyl ester of acrylic acid or methacrylic acid (ethyl (meth)acrylate) in the monomer composition is from 45 to 85 wt % based on the total monomers of the monomer composition. The amount of the ethyl (meth)acrylate in the monomer composition is preferably, from 50 to 80 wt % based on the total monomers of the monomer composition. The amount of the ethyl(meth)acrylate means, the total amount of ethyl acrylate and ethyl methacrylate if the monomer composition comprises these two monomers.

The specific itaconic ester used in the present invention is characterized by the following formula (1):

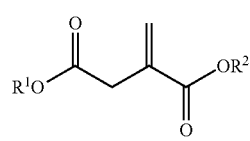

In the formula (1), $R^1$ and $R^2$ are separately hydrogen atom or alkyl group having 1 or 2 carbon atoms. When either $R^1$ or $R^2$ is hydrogen atom, the other is not hydrogen atom.

The amount of the itaconic ester (b) in the monomer composition is from 15 to 45 wt % based on the total monomers of the monomer composition. Preferably, the amount of the itaconic ester (b) in the monomer composition is from 20 to 40 wt % based on the total monomers of the monomer composition.

Examples of the itaconic ester (b) used in the present invention include monomethyl itaconate (MMI), dimethyl itaconate (DMI), monoethyl itaconate (MEI) and diethyl itaconate (DEI). Surprisingly, inventors of this invention found that when those itaconic esters are used instead of itaconic esters which have longer alkyl group (the number of carbon atoms is larger than 4), stain resistance of the coating composition increased significantly.

The polymer may further comprise, as a polymerization unit, from 0.1 to 3 wt %, preferably from 0.3 to 2 wt %, more preferably from 0.5 to 1.5 wt %, based on the dry weight of the polymer, of an ethylenically unsaturated monomer having at least one functional group selected from carboxyl group, carboxylic anhydride group, hydroxyl group, amide group, sulfonic acid group or phosphate group. These monomers are called as "functional monomer(s)" in the specification. Examples of these functional monomers include, but are not limited to, ethylenically unsaturated carboxylic or dicarboxylic acids such as acrylic or methacrylic acid; itaconic acid; maleic acid or amides such as N-alkylolamides; and hydroxyalkyl esters of the above-mentioned carboxylic acids such as (meth)acrylamide, N-methylol (meth)acrylamide, 2-hydroxyethyl(meth)acrylamide, hydroxyethyl (meth)acrylate and hydroxypropyl (meth) acrylate. More preferably, the functional monomer is selected from methyl acrylic acid, acrylic acid, itaconic acid, acrylamide, methacrylamide, sodium vinyl solfonate or sodium styrenic sulfonate (SSS). Functional monomer is worked as stabilizer of a polymer dispersion. When more than 3.0% of functional monomer is included in a coating composition, the stain resistance of a coating formed from the coating composition is decreased. In addition, more functional monomers cause poor scrub resistance of a coating formed from the coating composition.

The weight of sum of the weight of (a) the ethyl ester of acrylic acid or methyl acrylic acid and the weight of (b) the itaconic ester is from 65 to 99% based on the total weight of the polymer. Preferably, the weight of sum of the weight of (a) the ethyl ester of acrylic acid or methyl acrylic acid and the weight of (b) the itaconic ester is from 70 to 90% based on the total weight of the polymer.

The polymer has glass transition temperature (Tg) from −20 to 40 degrees C. (° C.). Preferably, the polymer has Tg from −10 to 40° C. A polymer with more than 40° C. of Tg will need more coalescent, while a polymer with less than −20° C. of Tg is too soft and will have poor performance. Tg can be measured by Differential Scanning Calorimetry (DCS).

The average particle diameter of the polymer dispersion particles is from 50 to 350 nanometers (nm), preferably from 50 to 300 nm measured by a BI-90 Particle Sizer.

The polymer has a weight average molecular weight of at least 50,000 Daltons as determined by gel permeation chromatography. Preferably, the polymer has a weight average molecular weight within the range of from 100,000 to 1,000,000 Daltons. Weight average molecular weight, $M_w$, is measured by gel permeation chromatography (GPC) using polyacrylic acid standards, as is known in the art. The techniques of GPC are discussed in detail in "Modern Size Exclusion Chromatography", W. W. Yau, J. J. Kirkland, D. D. Bly; Wiley-Interscience, 1979, and in "A Guide to Materials Characterization and Chemical Analysis", J. P. Sibilia; VCH, 1988, p. 81-84. The molecular weights reported herein are all in weight average molecular weights and are all in units of Dalton.

The polymer of the present invention can be conveniently prepared by using the above-described monomers and by conventional polymerization processes. The polymerization processes for preparing the polymer are well known in the art, for example an emulsion polymerization. In the emulsion polymerization process, conventional surfactants can be used. Examples of the surfactants include, but are not limited to, anionic and/or nonionic emulsifiers such as alkali metals or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of the surfactant is from 0.1 to 6 wt % based on the total weight of the monomers. Either thermal or redox initiation processes can be used in the emulsion polymerization process. The reaction temperature is maintained at a temperature lower than 100° C. throughout the emulsion polymerization process. Preferably, reaction temperature is between 30° C. and 95° C., more preferably between 50° C. and 90° C. A mixture of the above-described monomers can be added in a reaction vessel as it is or as an emulsion in water. The monomers can be added in a reaction vessel at once, intermittently or continuously, over the reaction period.

After the polymerization step (process) described above, an optional step to decrease residual monomer can be conducted. The step is also called as 'chase down step'. The chase down step is the addition of a combination of free radical initiator and reducing agent. Conventional free radical initiators can be used for this step, and are, for example, hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid. Typically the amount of the free radical initiator is from 0.01 to 3.0 wt % based on the weight of total monomer. Suitable reducing agent includes sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, amines such as ethanolamine, glycolic acid, glyoxylic acid hydrate, lactic acid, glyceric acid, malic acid, tartaric acid and salts of the preceding acids. Redox reaction catalyzing metal salts of iron, copper, manganese, silver, platinum, vanadium, nickel, chromium, palladium, or cobalt can be used as a reducing agent. Chelating agents for the metals can be used optionally. The reaction time is from 0.5 to 5 hours, the reaction temperature is between 50° C. to 75° C. The residual monomer can be decreased to 0.0005 wt % or less, preferably 0.0002 wt % or less, based on the total weight of the coating composition.

The polymer of the present invention can be added in the coating composition as a binder. The coating composition comprises other components than the polymer. The other components include a dispersant, a thickener, a pigment, an extender and a solvent. Normally, a coating composition is prepared by the following steps: adding water, a dispersant, a thickener and a pigment in a tank, then agitating these ingredients in high speed (1,000 to 2,500 rpm) to make 'let down part' of the coating composition. After that, adding a binder, coalescent and neutralizer in the let down to get the coating composition. Coating compositions include, but are not limited to, latex paint formulations, cosmetic formulations, dentifrices, hand lotions, automotive coatings formulations, architectural and industrial coatings formulations, caulks, adhesives, and sealants.

The binder is typically present in the coating composition at levels ranging from 2 to 50 wt %, based on the total weight of the coating composition. The coating composition may also include colorants containing colored pigments that provide tint to coating compositions such as paints and semitransparent stains. Factors affecting the amount of colorant added to a coating composition to obtain a desired color are the light scattering efficiency and the light absorbing efficiency of the colored pigments. The scattering and absorbing efficiencies of coating compositions are affected by the extent of dispersion of the colored pigments in the coating compositions. Colored pigment particles that are well dispersed and separated from each other are believed to provide increased color and optionally, increased hiding of coating compositions. The coating composition can be formulated to a desired color with lower levels of the colored pigments than compositions in which the colored pigments are poorly dispersed. Alternatively, a coating composition having well dispersed colored pigments typically displays more intense colors, and permits the preparation of colored coatings with a broader color palette.

The coating composition according to the present invention can further include one or more of the following additives: fillers and pigments, such as titanium dioxide, mica, calcium carbonate, silica, zinc oxide, milled glass, aluminum trihydrate, talc, antimony trioxide, fly ash, and clay; polymer encapsulated pigments, such as polymer-encapsulated or partially encapsulated opacifying pigment particles such as titanium dioxide, zinc oxide, or lithopone particles; polymers or polymer emulsions adsorbing or bonding to the surface of pigments such as titanium dioxide; hollow pigments, including pigments having one or more voids; dispersants, such as aminoalcohols and polycarboxylates; surfactants; defoamers; preservatives, such as biocides, mildewcides, fungicides, algaecides, and combinations thereof; flow agents; leveling agents; and additional neutralizing agents, such as hydroxides, amines, ammonia, and carbonates.

For example, the coatings composition may include i) polymer-encapsulated opacifying pigment particles, such as titanium dioxide particles, having a diameter in the range of 100 nm to 500 nm and an index of refraction of at least 1.8; ii) an encapsulating polymer, and iii) a polymeric dispersant for the encapsulated opacifying pigment particles and the encapsulating polymer. Such polymer-encapsulated opacifying pigment particles are described, for example, in U.S. Patent Publication US 2010/0298483 A1. In another example, the coating composition may include polymer-encapsulated opacifying pigment particles as described in WO 2007/112503 A1.

The pigment particles contained in the composition can be white and nonwhite pigments. The pigment particles provide any color including white to the coating composition. Pigment particles include colored pigments, white pigments, black pigments, metal effect pigments and luminescent pigments such as fluorescent pigments and phosphorescent pigments. The term "pigment particles" as used herein includes white pigment particles such as titanium dioxide, zinc oxide, lead oxide, zinc sulfide, lithophone, zirconium oxide and antimony oxide. Examples of colors for polymer compositions comprising the pigments include black, magenta, yellow and cyan, as well as combinations of these colors such as orange, blue, red, pink, green and brown. Other suitable colors for polymer compositions comprising the pigments include fluorescent colors; metallic colors such as silver, gold, bronze and copper; and pearlescent pigments. These colors are obtained by employing one or more different types of colorant particles.

The pigment particles include inorganic colorant particles and organic colorant particles. Typically, the pigment particles have average particle diameters in the range of from 10 nm to 50 μm, preferably in the range of from 40 nm to 2 μm.

Suitable inorganic pigment particles include, but are not limited to, titanium dioxide pigments, iron oxide pigments such as goethite, lepidocrocite, hematite, maghemite, and magnetite; chromium oxide pigments; cadmium pigments such as cadmium yellow, cadmium red, and cadmium cinnabar; bismuth pigments such as bismuth vanadate and bismuth vanadate molybdate; mixed metal oxide pigments such as cobalt titanate green; chromate and molybdate pigments such as chromium yellow, molybdate red, and molybdate orange; ultramarine pigments; cobalt oxide pigments; nickel antimony titanates; lead chrome; blue iron pigments; carbon black; and metal effect pigments such as aluminum, copper, copper oxide, bronze, stainless steel, nickel, zinc, and brass.

Suitable organic pigment particles include, but are not limited to, azo pigments, monoazo pigments, diazo pigments, azo pigment lakes, β-naphthol pigments, naphthol AS pigments, benzimidazolone pigments, diazo condensation pigment, metal complex pigments, isoindolinone, and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, and diketopyrrolo pyrrole pigments.

Suitable extender includes, but are not limited to, a particulate inorganic material having a refractive index of less than or equal to 1.8 and greater than 1.3. Examples of such extender includes, for example, calcium carbonate, clay, calcium sulfate, aluminosilicates, silicates, zeolites, mica, diatomaceous earth, solid or hollow glass and ceramic beads. The coating composition may optionally contain solid or hollow polymeric particles having a Tg of greater than 60° C., such polymeric particles are classified as extenders for purposes of PVC calculations herein. The details of hollow polymeric particles are described in EP22633, EP915108, EP959176, EP404184, U.S. Pat. No. 5,360,827, WO 00/68304 and US20100063171. The solid polymeric particles have particle size from 1 to 50 microns, preferably from 5 to 20 microns.

EXAMPLES

Raw materials used in Examples are shown in Table 1.

TABLE 1

| Chemical name (abbreviation or product name) | Function | Supplier |
| --- | --- | --- |
| Dimethyl itaconate (DMI) | Monomer | Proviron |
| Diethyl itaconate (DEI) | Monomer | Proviron |
| Dibutyl itaconate (DBI) | Monomer | HanerChem Company |
| Butyl acrylate (BA) | Monomer | Dow Chemical |
| Ethyl acrylate (EA) | Monomer | Dow Chemical |
| Methyl methacrylate (MMA) | Monomer | Dow Chemical |
| Itaconic acid (IA) | Monomer | Sinopharm Chemical Reagent Co., Ltd. |

TABLE 1-continued

| Chemical name (abbreviation or product name) | Function | Supplier |
|---|---|---|
| 3-(Trimethoxysilyl)propyl methacrylate (A-174) | Monomer | Momentive |
| Methacrylic acid (MAA) | Monomer | Sinopharm Chemical Reagent Co., Ltd. |
| tetrasodium salt of ethylenetetrediaminaacetic acid (EDTA) | Initiator | Sinopharm Chemical Reagent Co., Ltd. |
| tert-butyl hydroperoxide (t-BHP) | Initiator | Sinopharm Chemical Reagent Co., Ltd. |
| Isoascorbic acid (IAA) | Initiator | Sinopharm Chemical Reagent Co., Ltd. |
| Sodium persulfate (SPS) | Initiator | Sinopharm Chemical Reagent Co., Ltd. |
| Ammonium persulfate (APS) | Initiator | Sinopharm Chemical Reagent Co., Ltd. |
| 2-methyl-2-amino-propanol (AMP-95) | Base | Dow Chemical |
| Anionic surfactant (A-102) | Surfactant | Cytec |
| Polyacid (Orotan ™ 1124) | Dispersant | Dow Chemical |
| Nonionic silicon oil (Nopco NXZ) | Defoamer | Nonionic silicon oil |
| Emulsion of a polyether siloxane copolymer (Tego Foamex 825) | Defoamer | Evonik |
| Titanium dioxide (Ti-Pure ™ R-706) | Pigments | E. I. Du pont Nemours and Company |
| Biocide (Rocima 363) | Biocide | Dow Chemical |
| Calcium carbonate (CC-1000) | Extender | Guangfu Building Materials Group (China) |
| Trimethylpentanediol isobutyrate (Texanol) | Coalescent | Eastman |
| Nonionic surfactant (Tergitol 15-S-9) | Surfactant | Dow Chemical |
| Nonionic surfactant (Tergitol 15-s-40 (70%)) | Surfactant | Dow Chemical |
| Phosphate surfactant (RS-610) | Surfactant | Solvay |
| Sodium hydrosulfite | Reductant | Sinopharm Chemical Reagent Co., Ltd. |
| Hydrophobically modified polyacid (Acrysol TT-615) | Thickener | Dow Chemical |
| Hydrophobically modified polyacid (Acrysol TT-935) | Thickener | Dow Chemical |
| Hydrophobically modified ethoxylate urethane (Acrysol RM-5000) | Thickener | Dow Chemical |

Inventive Example 1

A monomer emulsion was prepared by mixing 220.3 g EA, 73.8 g DMI, 74.7 g MMA, 61.5 g BA, 4.56 g IA, 0.91 g A-174, 21.92 g 25% active RS-610 and 124.8 g deionized (DI) water and emulsified with stirring. 4.28 g 32% by weight aqueous solution of A-102 and 137 g DI water were charged to a 1 liter multi-neck flask (reactor) fitted with mechanical stirring. The contents of the flask were heated at 75° C. under a nitrogen atmosphere. A mixture of 16.8 g of the monomer emulsion, 0.005 g $FeSO_4 7H_2O$ with 0.01 g EDTA, 0.14 g Sodium hydrosulfite in 3 g water, 0.29 g APS in 9 g DI water were added to the reactor. After that, the remaining monomer emulsion, 0.96 g APS in 39 g water solution, 0.24 g IAA in 39 g water solution were added gradually in the reactor over 120 minutes. Reactor temperature was maintained at 74° C. Then, 8 g DI water was used to rinse the emulsion feed line to the reactor. Thereafter, 1.31 g t-BHP in 17 g water, 0.86 g IAA in 17 g water were fed into the reactor over 60 minutes under agitation. The content of reactor was cooled to room temperature. 50.85 g NaOH solution (NaOH content is 6.8%) was added in the reactor as neutralizer over 10 minutes. The particle size of sample was 125 nm. Solid content was 48.67%, pH was 7.64%.

Inventive Examples 2 to 3 and Comparative Examples 1, 3 and 4

The same procedures as of Inventive Example 1 were conducted excepting for the different monomers and those amounts listed in Table 2 were used.

Comparative Example 2

The process same as US2013/0065070(A1) example 1 was conducted. The calculated Tg was adjusted to 25° C. A monomer mixture comprising 55.2 g AA, 495.2 g BA with 550.4 g DMI, 1100 g water and 102 g 30% SLS was added into a reactor. Reactor temperature was adjusted to 94° C. Then 6 g $NaHCO_3$ in 40 g water, 110.1 g monomer mixture, 0.9 g SPS in 35 g water were added into the reactor. The remaining monomer mixture and 5.1 g SPS in 200 g water were gradually fed into the reactor over 210 minutes. After the feeding of monomer mixture, the reaction was hold over 10 minutes. Then 63.1 g ST and 63.1 g BA were fed into the reactor over 30 minutes as chaser monomer. After adding the chaser monomer, the reaction was hold over 30 minutes. Then the reactor was cooled to 70° C., 1.31 g t-BHP in 17 g water, 0.86 g IAA in 17 g water were fed into the reactor over 60 minutes with agitation. After the reactor was cooled to 50° C., ammonium solution (28% solution) was added in the reactor to adjust the pH to around 7.0.

TABLE 2

| | Comparative Examples | | | | | Inventive Examples | | |
|---|---|---|---|---|---|---|---|---|
| | 1 | 2 | 3 | 4 | 5 | 1 | 2 | 3 |
| DMI | | 45 | | 0 | 42.8 | 16.8 | 0 | 33.8 |
| DEI | | | | 37.8 | 0 | 0 | 30 | 0 |
| EA | | | 70 | 7 | 10 | 50 | 50 | 65 |
| BA | 50 | 45.5 | | 33 | 46 | 14 | 0 | 0 |
| MMA | 48.8 | | 28.8 | 21 | 0 | 18 | 16.8 | 0 |
| ST | | 5 | | | | | | |
| AA | | 5 | | | | | | |
| IA | 1 | | 1 | 1 | 1 | 1 | 1 | 1 |
| A-174 | 0.2 | | 0.2 | 0.2 | 0.2 | 0.2 | 0.2 | 0.2 |
| Particle size (nm) | 132 | 87 | 108 | 130 | 135 | 125 | 134 | 129 |
| Solid (%) | 48.1 | 43.84 | 49.2 | 48.77 | 48.62 | 48.67 | 49.5 | 49.3 |
| pH | 7.2 | 7.1 | 7.35 | 7.4 | 7.27 | 7.64 | 7.3 | 7.1 |

Paint Formulation

The binder was evaluated in the paint formulation shown in Table 3.

TABLE 3

| Paint ID | Dosage (g) |
|---|---|
| Grind | |
| Water | 90.00 |
| Orotan 1124 | 6.00 |
| Acrysol RM-5000 | 10.00 |
| Tergitol 15-S-9 | 3.00 |
| Tego Foamex 825 | 2.00 |
| AMP-95 | 0.50 |
| Ti-Pure R-706 | 330.00 |
| CC-1000 | 230.00 |
| Rocima 363 | 2.00 |
| Grind Sub-total | 673.50 |
| LetDown | |
| Binder | 471.61 |
| Water | 219.20 |
| Nopco NXZ | 2.00 |
| AMP-95 | 2.60 |
| Texanol | 27.60 |
| Acrysol RM-5000 | 20.00 |
| Acrysol TT-615 | 2.14 |
| Acrysol TT-935 | 1.43 |
| Tergitol 15-s-40 (70%) | 3.00 |
| Totals | 1423.08 |

If the binder solid is different, same solid of polymer is added and water is adjusted accordingly.

Stain Resistance Test

To test the stain performance of clear top coating, a black vinyl chart P-121-10N (Leneta) was coated by coating composition (followed by drying it for 7 days in a constant temperature room (CTR, 25° C., 50% R.H.). Hydrophobic stains such as lipstick, pencil, ball pen, crayon(blue), crayon(green), crayon(pink), were applied on the sample surface. Hydrophilic stains including red wine, coffee, black tea, green tea, and ink were applied by placing gauze saturated with the corresponding stains on sample surface and allowing them stay on sample surface for 2 hours. Prior to stain test, excessive liquid stains were wiped off with a paper towel. The stain removal test was conducted on a modified scrub machine with a boat filled with a 3M™ commercial sponge saturated with 1% household detergent solution. 1 KG weight was placed on the boat to ensure that all the samples were tested under the same pressure. Each sample was washed for 100 cycles. Before reading, the sample charts were rinsed using regular water followed by complete drying at room temperature. Stain performance was evaluated by visual ranking following the standard described in Table 4. Sum of anti-stain scores of each formulation to different tested stains was used to evaluate the stain resistance. The higher the sum score, the better the stain resistance of the paint formulation.

TABLE 4

| Stain resistance and removal ranking | State |
|---|---|
| 10 | No stain or trace stains left |
| 8 | 70% to 90% stain removed |
| 6 | More than 50% stain removed |
| 4 | Less than 50% removed or obvious stain marks left |
| 1~2 | Almost no stain removed |

As shown in Table 5, for comparative examples 1 and 2, the total weight amount of Itaconic ester and EA are 44.8% and 52.8%, respectively. The anti-stain scores of Comparative Examples 1 and 2 are 43 and 47 respectively. In contrast, the total weight amounts of itaconic ester and EA of Inventive examples 1 to 3 were increased to 66.8%~98.8%. It is obviously that the anti-stain scores were improved to 66 especially for crayon resistance.

TABLE 5

| | Comparative Examples | | | | | Inventive Examples | | |
|---|---|---|---|---|---|---|---|---|
| | 1 | 2 | 3 | 4 | 5 | 1 | 2 | 3 |
| Itaconic ester + EA | 0 | 45 | 70 | 44.8 | 52.8 | 66.8 | 80 | 98.8 |
| Stain Removal | | | | | | | | |
| lipstick | 10 | 0 | 10 | 10 | 10 | 10 | 10 | 10 |
| Pencil | 3 | 0 | 3 | 3 | 3 | 3 | 3 | 3 |
| Ball Pen | 1 | 0 | 1 | 1 | 1 | 1 | 1 | 1 |
| Crayon (Pink) | 1 | 0 | 9 | 1 | 3 | 10 | 9 | 9 |
| Crayon (Blue) | 1 | 0 | 10 | 1 | 3 | 9 | 10 | 10 |
| Crayon (Green) | 1 | 0 | 3 | 1 | 1 | 7 | 7 | 7 |
| Red wine | 5 | 0 | 5 | 6 | 6 | 6 | 6 | 6 |
| Coffee | 3 | 0 | 4 | 4 | 4 | 4 | 4 | 4 |
| black tea | 7 | 0 | 5 | 7 | 7 | 7 | 7 | 7 |
| green tea | 5 | 0 | 3 | 4 | 4 | 4 | 4 | 4 |
| ink | 7 | 0 | 4 | 5 | 5 | 5 | 5 | 5 |
| Total anti-stain scores | 43 | 0 | 57 | 43 | 47 | 66 | 66 | 66 |

Inventive Examples 4 to 6 and Comparative Examples 6 to 8

The same procedures were conducted as of Inventive Example 1 excepting for the different monomers and those amounts listed in Table 6 were used.

TABLE 6

| | Comparative Examples | | | Inventive Examples | | |
|---|---|---|---|---|---|---|
| Examples | 6 | 7 | 8 | 4 | 5 | 6 |
| DMI | 33.3 | 31.8 | | 35.8 | 34.8 | 35.8 |
| DEI | | | | | | |
| DBI | | | 30 | | | |
| EA | 63 | 63 | 40.8 | 63 | 63 | 63 |
| BA | | | | | | |
| MMA | | | 28 | | | |
| MAA | | | | | | 1 |
| ST | | | | | | |
| AA | | | | | | |
| IA | 3.5 | 5 | 1 | 1 | 2 | |
| A-174 | 0.2 | 0.2 | 0.2 | 0.2 | 0.2 | 0.2 |

TABLE 6-continued

| | Comparative Examples | | | Inventive Examples | | |
|---|---|---|---|---|---|---|
| Examples | 6 | 7 | 8 | 4 | 5 | 6 |
| Particle size (nm) | 168 | 170 | 139 | 170 | 169 | 155 |
| Solid (%) | 49.3 | 49.1 | 48.8 | 49.4 | 49.4 | 50.1 |
| pH | 7.5 | 7.8 | 7.6 | 7.9 | 7.0 | 7.8 |

The stain resistance test results are shown in Table 7.

TABLE 7

| | Comparative Examples | | | Inventive Examples | | |
|---|---|---|---|---|---|---|
| | 6 | 7 | 8 | 4 | 5 | 6 |
| Itaconic ester + EA Stain Removal | 96.3 | 94.8 | 40.8 | 98.8 | 97.8 | 98.8 |
| lipstick | 10 | 10 | 10 | 10 | 10 | 10 |
| Pencil | 3 | 3 | 3 | 3 | 3 | 3 |
| Ball Pen | 1 | 1 | 1 | 1 | 1 | 1 |
| Crayon (Pink) | 9 | 9 | 1 | 9 | 9 | 9 |
| Crayon (Blue) | 10 | 10 | 1 | 10 | 10 | 10 |
| Crayon (Green) | 7 | 7 | 1 | 7 | 7 | 7 |
| Red wine | 3 | 3 | 5 | 5 | 5 | 5 |
| Coffee | 4 | 4 | 4 | 4 | 4 | 4 |
| black tea | 2 | 2 | 5 | 4 | 3 | 4 |
| green tea | 2 | 2 | 2 | 2 | 2 | 2 |
| ink | 3 | 3 | 5 | 6 | 6 | 6 |
| Total anti-stain scores | 54 | 54 | 38 | 61 | 60 | 61 |

For Comparative Examples 6 and 7, the amounts of IA were increased to 3.5 and 5 respectively. The total anti-stain scores were not good. For Comparative Example 8, DBI was used instead of DEI. The total anti-stain score was significantly decreased.

The invention claimed is:

1. A coating composition comprising a polymer, wherein the polymer comprises, as polymerization units, based on the total weight of the polymer:
   (a) from 45 wt % to 85 wt % of ethyl ester of acrylic acid;
   (b) from 15 wt % to 40 wt % of at least one itaconic acid ester having the following formula:

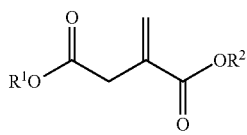

wherein $R^1$ and $R^2$ are separately hydrogen atom or alkyl group having 1 or 2 carbon atoms, and when either $R^1$ or $R^2$ is hydrogen atom the other is not hydrogen atom; and
   (c) optionally an ethylenically unsaturated monomer having at least one functional group selected from carboxyl group, carboxylic anhydride group, hydroxyl group, amide group, sulfonic acid group or phosphate group; and
   the weight of sum of (a) and (b) is 65% or more based on the total weight of the polymer.

2. The coating composition of claim 1, the ethylenically unsaturated monomer having at least one functional group selected from carboxyl group, carboxylic anhydride group, hydroxyl group, amide group, sulfonic acid group or phosphate group is selected from itaconic acid, acrylic acid or methacrylic acid, and the weight of the ethylenically unsaturated monomer is 2.0% or less based on the total weight of the polymer.

3. The coating composition of claim 1, wherein the polymer has from −10 to 40 degrees C. of glass transition temperature.

4. The coating composition of claim 1, wherein the polymer has average particle size from 50 to 350 nanometers.

5. The coating composition of claim 1, further comprises a grinding additive, a pigment and an extender.

6. The coating composition of claim 1, wherein the composition comprises free itaconic acid ester monomers with 0.005% or less based on the total weight of the coating composition.

7. A method for preparing the coating composition of claim 1, comprising the step of (i) polymerizing a polymer from a monomer composition comprising (a) from 45 wt % to 85 wt % of ethyl ester of acrylic acid, (b) from 15 wt % to 40 wt % of at least one itaconic acid or itaconic acid ester having the following formula:

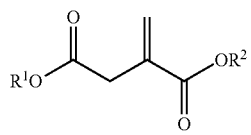

wherein $R^1$ and $R^2$ are separately hydrogen atom or alkyl group having 1 or 2 carbon atoms, and when either $R^1$ or $R^2$ is hydrogen atom the other is not hydrogen atom; and
   (c) optionally an ethylenically unsaturated monomer having at least one functional group selected from carboxyl group, carboxylic anhydride group, hydroxyl group, amide group, sulfonic acid group or phosphate group, and
the weight of sum of (a) and (b) is 65% or more based on the total weight of monomers in the monomer composition.

* * * * *